(12) United States Patent
Meador (10) Patent No.: US 9,315,632 B1
(45) Date of Patent: Apr. 19, 2016

(54) PROCESS FOR PREPARING EPOXY-REINFORCED SILICA AEROGELS

(75) Inventor: Mary Ann B Meador, Strongsville, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 13/242,425

(22) Filed: Sep. 23, 2011

Related U.S. Application Data (63) Continuation-in-part of application No. 11/582,693, filed on Oct. 19, 2006, now Pat. No. 8,067,478.

(51) Int. Cl.
*C08G 77/38* (2006.01)
*C08G 77/388* (2006.01)
*C08G 101/00* (2006.01)

(52) U.S. Cl.
CPC ........ *C08G 77/38* (2013.01); *C08G 2101/0091* (2013.01)

(58) Field of Classification Search
CPC ................ C08G 77/38; C08G 77/388; C08G 2101/0091
USPC .................................................. 521/99, 154
See application file for complete search history.

(56) References Cited

U.S. PATENT DOCUMENTS

| | | |
|---|---|---|
| 3,940,426 A | 2/1976 | Itatani |
| 4,958,002 A | 9/1990 | Imatani |
| 5,258,530 A | 11/1993 | Katsura |

OTHER PUBLICATIONS

Nguyen et al. (Applied Materials and Interfaces, vol. 2(5), 1430-1443, 2010, Available on the Web, Apr. 28, 2010).*
Meador et al. (Applied Materials and Interfaces, vol. 2(7), 2162-2168, 2010, Available on the Web, Jun. 30, 2010).*
Meador et al. (Applied materials and Interfaces, vol. 1(4), 894-906, 2009).*
Meador et al. (Chem. Mater. 2005, 17, 1085-1098).*
Wen et al. (Chem. Mater. 1996, 8, 1667-1681).*

* cited by examiner

*Primary Examiner* — Liam J Heincer
(74) *Attorney, Agent, or Firm* — Robert H. Earp, III

(57) ABSTRACT

One-pot reaction process for preparing epoxy-reinforced monolithic silica aerogels comprising the reaction of at least one silicon compound selected from the group consisting of alkoxysilanes, orthosilicates and combination thereof in any ratio with effective amounts of an epoxy monomer and an aminoalkoxy silane to obtain an epoxy monomer-silica sol in solution, subsequently preparing an epoxy-monomer silica gel from said silica sol solution followed by initiating polymerization of the epoxy monomer to obtain the epoxy-reinforced monolithic silica aerogel.

12 Claims, 12 Drawing Sheets

PROCESS FOR PREPARING EPOXY-REINFORCED SILICA AEROGELS

CROSS REFERENCE

This application is a continuation-in-part of co-pending application Ser. No. 11/582,693 filed Oct. 19, 2006, now U.S. Pat. No. 8,067,478.

ORIGIN OF INVENTION

The invention described herein was made by employees of the United States Government and may be manufactured and used by or for the Government for governmental purposes without the payment of any royalties thereon or therefore.

FIELD OF THE INVENTION

This invention relates to a one-pot reaction process for preparing epoxy-reinforced monolithic silica aerogels and more specifically to a process for preparing epoxy-reinforced monolithic silica aerogels derived from the reaction of at least one silicon compound selected from the group consisting of alkoxysilanes, orthosilicates and a combination thereof with effective amounts of an aminoalkoxy silane and an epoxy monomer to obtain an epoxy monomer-silica sol in solution. Subsequently, forming an epoxy-monomer silica gel from said silica sol solution follow by subjecting said silica gel to conditions that promotes polymerization of the epoxy monomer followed by drying said polymerized epoxy-silica gel to obtain the epoxy-reinforced monolithic silica aerogel.

This process introduces the epoxy monomer into the silica sol solution before gellation either as an agent which co-reacts with the oxide gel or as a soluble epoxy precursor which does not interact with oxide gel in any way or both. Subsequent exposure of the epoxy-monomer silica gel to heat, light, catalyst or any other method of promoting polymerization of the monomer causes epoxy cross-linking without the need for any additional infiltration steps thereby significantly shortening the process steps. Another advantage is that the resulting silica aerogel monolith is more uniform, since the addition of the epoxy crosslinker is not limited by diffusion. Moreover, where complete polymerization requires a balanced stoichiometry, this requirement is more easily met by this one-pot process. The primary requirement of the one-pot reaction process is that the epoxy cross-linking agent does not interfere with gellation of the silica. This means that the epoxy monomer molecules are present in the sol, but are substantially inert until conditions are met for polymerization or they partially react with the forming gel at low enough concentration to allow gellation to take place.

The important and unique feature of this invention is that instead of a process wherein the epoxy monomer is infiltrated into an already formed silica gel by soaking this invention introduces the epoxy monomer into the silica sol before gellation either as an agent which co-reacts with the oxide gel or as a soluble epoxy monomer which does not interact with the forming oxide gel in any way. This process eliminates multiple washing and soaking steps thereby significantly shortening the process. Essentially, the production of an epoxy cross-linked silica aerogel is produced in a one-pot synthesis. In addition, the resulting silica aerogel monolith of this invention is more uniform, since the addition of the epoxy cross-linker is not limited by diffusion. Moreover, where complete polymerization requires a balanced stoichiometry, this requirement is met more easily because diffusion is not a factor.

BACKGROUND OF THE INVENTION

Ceramic aerogels are among the most highly porous and lowest density materials. Their high porosity means that 95% or greater of the total bulk volume of a ceramic aerogel is occupied by empty space or air, producing excellent thermal as well as sound insulating qualities. In addition, their high specific surface area (e.g. on the order of 600-1000 $M^2/g$ the aerogels are well suited for numerous other applications. Unfortunately, however, conventional ceramic aerogels are physically and hydrolytically very unstable and brittle. Their macro-structure can be completely destroyed by minor mechanical loads e.g. vibrations or by exposure to moisture. Consequently, there has been little interest in ceramic aerogels for the above-mentioned reasons, despite their excellent properties, simply because aerogels are not sufficiently strong to withstand even minor or incidental mechanical stresses to be experienced in practical applications. Therefore, these aerogels have been used almost exclusively in applications where they experience substantially no mechanical loading. However, cross-linking silica-aerogels with a polymeric material has proven to be an effective process to increase the strength of these aerogels without adversely affecting their porosity and low density. Most of the present processes are very long and involved, requiring multiple washing and soaking steps to infiltrate the silica gel with the polymer monomer after gelation. In addition, infiltration is limited by diffusion, sometimes resulting in aerogel monoliths which are not uniformly cross-linked.

Thus, by cross-linking the epoxy polymer into the bulk structure of the silica gel, the resulting silica aerogel is reinforced while the mesoporous space between the particles is maintained. In the prior art processes, to provide polymer reinforced aerogels, the polymer crosslinker is reacted with the surface of the silica gel, because the silica particles are surface-terminated with reactive groups. Therefore, cross-linked aerogels are being prepared by polymerizing the prepolymer with the mesoporous surfaces of the silica gels in a two-step process.

SUMMARY OF THE INVENTION

This invention is directed to a one-pot process of cross-linking silica aerogels with an epoxy as an effective method to increase the strength of the aerogels without adversely affecting the porosity and low density of the aerogel. More specifically, the one-pot process of this invention introduces the epoxy monomer into the silica sol before gelation of the silica sol. Subsequent exposure of the epoxy-monomer silica gel to heat, light, catalyst or other method of promoting polymerization of the epoxy prepolymer causes epoxy cross-linking without the need for additional processing steps.

Accordingly, it is an object of this invention to provide a one-pot process for preparing epoxy-reinforced cross-linked monolithic silica aerogels.

It is another object of this invention to provide a one-pot reaction process for preparing an epoxy-reinforced monolithic silica aerogel derived from epoxy monomers.

It is a further object of this invention to provide a process for preparing epoxy-reinforced monolithic silica aerogels by reacting in one-pot at least one alkoxy silane and/or orthosilicates with an epoxy monomer and an aminoalkoxy silane.

DESCRIPTION OF THE DRAWINGS

FIG. 1. Graphs of empirical models of data from Table 1 for (a) density and (b) shrinkage vs total silicon concentration and mol fraction BTMSH.

FIG. 5. Graph of the (a) pore volume vs pore diameter of representative samples and (b) the empirical model for surface area plotted vs total Si concentration and mol fraction of Si derived from BTMS.

FIG. 6. Empirical model of modulus from compression graphed vs total Si concentration and fraction of BTMSH-derived Si for (a) 15 mol % APTES and (b) 45 mol % APTES.

FIG. 7. (a) Stress-strain curves for repeat compression tests taken to 25% strain where the solid lines are the first and second compression for sample containing no BTMSH and the dotted lines are the first and second compressions for the same formulation with 40 mol % BTSMH; and (b) graphs of empirical models for recovered strain after compression to 25% strain graphed vs total Si concentration and fraction of BTMSH-derived Si.

DESCRIPTION OF THE PREFERRED EMBODIMENT

This invention relates to a process for preparing epoxy-reinforced cross-linked silica aerogels which comprises a one-pot reaction of at least one alkoxy silane and/or an orthosilicate in the presence of effective amounts of an epoxy monomer and an aminoalkoxy silane in an alcohol solution, to obtain a silica sol. This silica sol in solution is then gelled and subsequently subjected to polymerization by the use of heat, U.V. light, catalyst or any other method that promotes polymerization causing the epoxy prepolymer to polymerize and crosslink with the nanostructured framework of the silica gel. The silica gel reaction product is supercritically dried forming the epoxy-reinforced crosslinked monolithic silica aerogel. The temperatures in the one-pot reaction process generally range from about 70° C. up to 200° C. depending on which of the alkoxy silanes and/or orthosilicates and aminoalkoxy silanes are being reacted in the presence of the epoxy precursor. The effective amounts of each of the reactants depend on the specific alkoxy silane orthosilicates and amino-alkoxy silane in the initial reaction and can range from about stoichiometric to excess amount of the epoxy monomers.

Generally, the silanes useful for preparing the epoxy reinforced monolithic aerogels of this invention include the di- and tri-/tetra-functional alkoxide reactants including the alkoxides of silicon having two, three and four Si—O bonds, respectively. Specific examples of silanes include the alkyltrialkoxy silanes such as methyltrimethoxysilane, ethyltrimethoxysilane, vinyltrimethoxysilane, amino-propyl triethoxysilane, and methyltriethoxysilane. The tetraalkoxy silanes include tetramethoxysilane, tetraethoxysilane, tetrapropoxysilane, bis(trimethoxylsilyl)ethane, bis(trimethoxysilylhexane and bis(trimethoxy)octane. The alkyldialkoxy silanes include diethyldiethoxysilane, diethydibutoxysilane, dimethyldiethoxysilane, methyldiethoxysilane, dimethyldimethoxysilane, diphenyldimethoxysilane, vinylmethyldiethoxysilane, divinyldiethoxysilane, and various combinations thereof in various ratios.

Examples of amino silanes include the aminoalkylpolyalkoxy silanes such as amino propyltrialkoxy silane, aminopropyltriethoxy silane, bis(trimethoxysilylpropyl)amine and the aminoaryl polyalkoxy silanes. Examples of silicates include the alkyl and aryl silicates such as tetramethylorthosilicate, tetraethyl orthosilicate and diphenylhydrogen orthosilicate. The epoxy examples include the polyfunctional epoxies such as diglycidyl aniline, and the alkylene bis (N, N diglycidyl) anilines.

The following examples illustrate the preparation on an epoxy-reinforced silica monolithic aerogels using the one-pot process of this invention.

Figure 8:
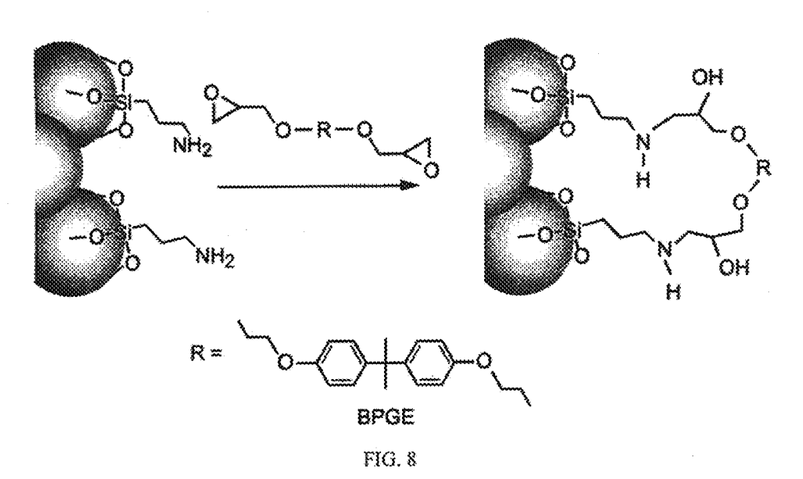
FIG. 8 Typical Reaction Scheme for Cross-Linking Silica Gels with Epoxy through Surface Amine Groups.
Figure 9:
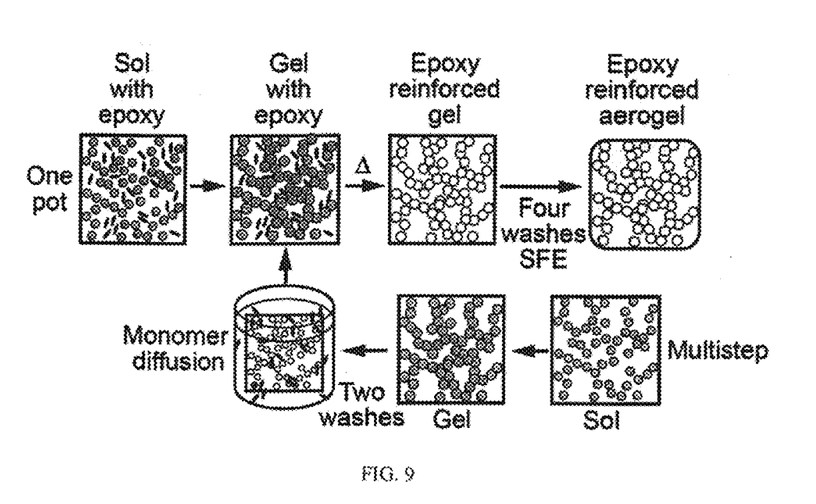
FIG. 9 Comparison of One Pot with Multistep Diffusion Process for Fabricating Epoxy Reinforced Aerogels.

Epoxy reinforced silica aerogels, as shown in Scheme 1, are especially interesting because these reactions can be produced using an alcohol such as ethanol instead of more expensive, less environmentally friendly solvents employed with other cross-linkers. Because so much solvent is used in the process of making the aerogels, this has a considerable effect on the cost to produce the aerogels. However, as seen in Scheme 2, the prior multistep process for making polymer reinforced aerogels can be quite long, involving production of the gel, solvent exchanges, diffusion of monomer, and heating to react the monomer, followed by more solvent exchanges and super-critical fluid extraction (SFE). This invention, however, discloses a new synthetic scheme that shortens the process to make epoxy-reinforced aerogels by eliminating monomer diffusion and at least half of the solvent washes. In this one-pot process, the ethanol soluble epoxy monomer is included in the initial step of the sol-gel process. Unlike other previous cross-linking chemistry, it will be shown that monomer incorporation does not interfere with gelation of the silane precursors. In addition, the effects of four different variables on the properties of the resulting aerogels made using the one-pot method are discussed and compared to previously reported aerogels using the multistep, diffusion controlled process. In this way, fundamental differences between aerogels made using the two processes are shown. Variables shown in Table 1 include total Si concentration, fraction of the total Si derived from bis(trimethoxysilyl)hexane (BTMSH) and 3-aminopropyltriethoxysilane (APTES), the concentration of epoxy monomer in the initial sol and the method used to control gelation. APTES provides the amines on the silica gel surface for reaction with the epoxy monomer, whereas the hexyl links from BTMSH have been shown to improve flexibility of the underlying silica backbone, resulting in less brittle failure. Some of the preferred compounds used in the one-pot process included: Tetraethylorthosilicate (TEOS), 1,6-bis(trimethoxysilyl)hexane (BTMSH), and 3-aminopropyl-triethoxysilane (APTES) and Bisphenol-A propoxylate diglycidyl ether (BPGE).

TEOS derived gels were made using a modified two-step process involving acid hydrolysis of TEOS, followed by base catalyzed condensation with APTES (and BTMSH). To illustrate, a typical procedure is outlined for a formulation with total Si concentration of 1.6 mol/L of the total sol, APTES Si fraction of 15 mol % and epoxy monomer, BPGE, in a 0.5 to 1 ratio to APTES (run 2 in Table 1). To a solution of 30.3 ml of TEOS (0.136 mol) in 16.3 ml of ethanol was added a solution of 14.4 ml of water (0.8 mols, based on a 5 to 1 ratio of water to total Si) and 0.005 ml concentrated nitric acid in 14.4 ml ethanol with stirring. The combined solution was stirred for 1 h. In the meantime, another solution was prepared consisting of 5.6 ml APTES (0.024 mol) and epoxy monomer, BPGE, (5.48 g. 0.012 mol) in 14.4 ml ethanol. These two solutions were cooled in a dry ice-acetone bath before combining and shaking vigorously. The resulting 100 ml of solution was then poured into five cylindrical molds, nominally 20 mm in diameter, which were made by cutting the needle end off of Norm-ject syringes and extending the plunger nearly all the way out. The gels, which formed in 5 to 15 min, were aged for 24 h before being extracted into clean ethanol by being pushed out of the molds with the plunger. The samples were heated to 24 h in a 70° C. oven to react the epoxy monomer with amine. After cooling and four solvent exchanges, the gels were dried by supercritical $CO_2$ fluid extraction followed by vacuum drying, yielding monoliths with average density of 0.365 g/cm$^3$.

A cylindrical specimen from each run was sectioned in half with a scroll saw. The top and bottom of each specimen was sanded and checked using an L-square to make certain that these surfaces were smooth and parallel. The samples were tested between a pair of compression platens on a Model 4505 instron load frame using the Series IX data acquisition software. The platen surfaces were coated with a graphite lubricant to reduce the surface friction and barreling of the specimen. The specimens were tested in accordance with ASTM D695 with the exception of sample size. Although the ASTM standard calls for slenderness ratio of 11-16 to 1, typified by a cylinder 12.7 mm in diameter by 50.8 mm in length, using this sample size in our testing lead to buckling in lower density specimens. In this study, the samples are nominally 16-18 mm in diameter and about 6-7 to 1.

Load-unload tests were also performed to determine the extent to which the samples recover after compression. In this case, samples were prepared identically to those for straight compression and the tests were carried out in the same manner except that the test was stopped at 25% strain. The sample was then compressed to 25% strain and was allowed to relax for 30 min, at which time the sample length was measured. The amount of recovered strain is reported as the percent sample length recovered after the first compression. The amount of recovered strain measured after the second compression had greater random error and hence it was not used in the statistical modeling.

Figure 1A:
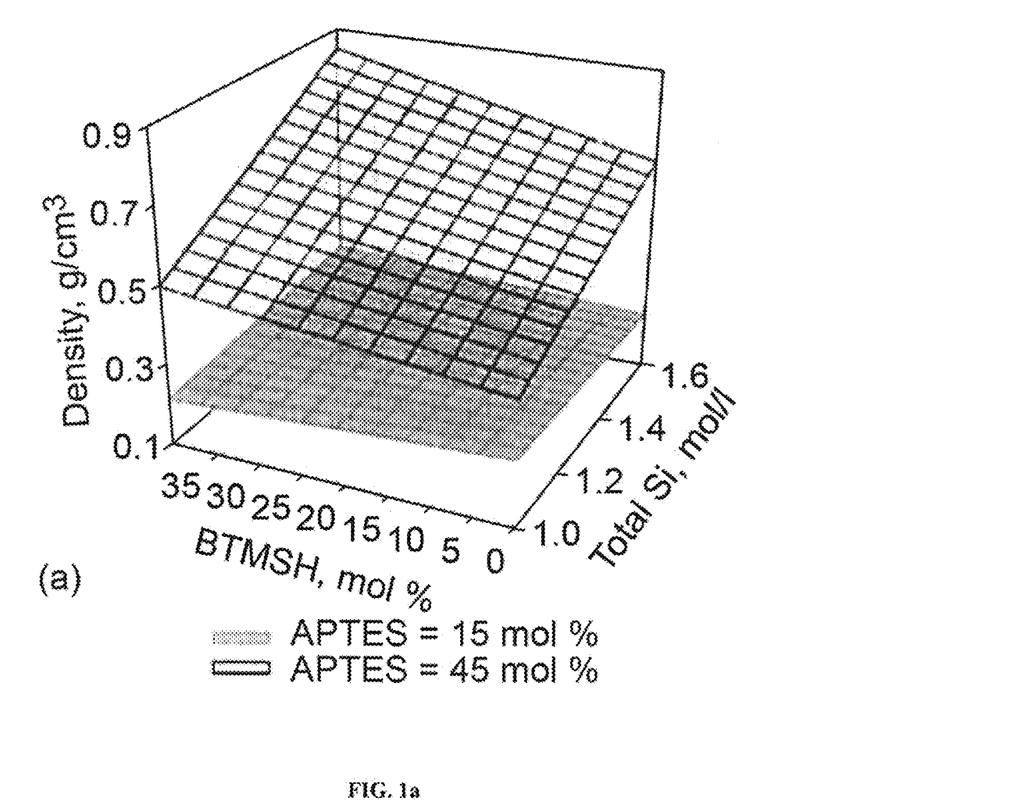
Figure 1B:
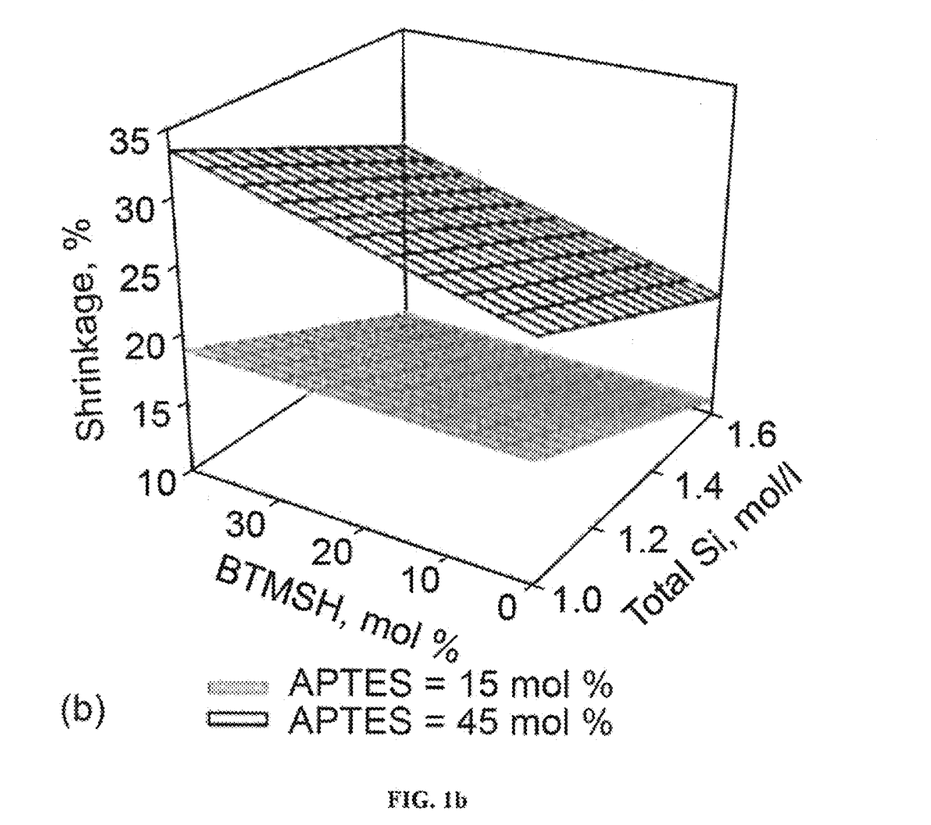

Preparation conditions and resulting properties of monoliths made in the study are shown in Table 1. Variables used in the study include the total concentration of silicon used to prepare the gels, mol fraction of the total silicon derived from APES and BTMSH (noting that BTMSH contributes two silicon atoms for every molecule, and the rest of the silicon is derived from TEOS), and the amount of epoxy (BPGE) in the sol given as a mole ratio to APTES. It is assumed that one epoxy molecule will react with two APTES amines. Hence, a BPGE to APTES ratio of 0.5 is stoichiometric, whereas a ratio 0.6-0.7 represents an excess of epoxy. By including the epoxy monomers in the initial sol, the synthesis is not only shortened but, because of the fact that cross-linking is not dependent of diffusion, polymer reinforcement is more efficient and more uniform. This is evidenced by the bulk densities of the monoliths made in the study, which ranged from 0.2 to up to 0.885 g/cm$^3$. Shown in FIG. 1a is a graph of the empirical model for density (standard error=0.019 g/cm$^3$, $R^2$=0.99+) derived from the measured monoliths. As seen in this graph, densities are much higher for aerogels made with higher concentrations of APTES. For aerogels made using 15 mol % APTES, densities are comparable to those previously made using a multistep synthesis, while the monoliths derived from 45 mol % APTES are 2-3 times more dense than previously reported. In fact, in earlier studies of aerogels made using APTES as an amine cross-linking site, increasing APTES was seen to increase density much less than expected. Preferred or to level off after a certain concentration, presumably because of surface saturation effects. That is after a certain concentration of APTES, the surface of the secondary particles is completely covered with amine. Any further increase in APTES concentration results in amines inaccessible to the monomer diffusing into the gel because they are buried inside the secondary particles. Using a one-pot reaction scheme with the monomer already present in the gel as it is formed, all of the amines are accessible to monomer. As seen in the plot of the empirical model for shrinkage (standard error=1.6%, $R^2$=0.94) shown in FIG. 1b, aerogels made using the one-pot method described herein using 15 mol % APTES tended to shrink less than monoliths made using 45 mol % APTES. However, this difference in shrinkage (10-15%) is not enough to account for the dramatic increase in density.

As expected, density also increases with increasing total silicon and mol fraction of BTMSH concentration as seen in FIG. 1a, because of greater amounts of silica and hexyl links in the resulting aerogels. Increasing the ratio of epoxy to APTES has only a small effect on density though using 0.5 equiv. of epoxy/APTES tended to result in more shrinkage of the monoliths. Thus, changes in properties which depend on density using lower equiv. of epoxy per APTES are more a result of shrinkage than an increase in polymer cross-linking. For this reason, all properties discussed and all graphs are shown with ratio of 0.7 epoxy molecules to APTES.

TABLE 1

Summary of Data for Epoxy Cross-Linked Aerogels from Optimization Study

| run | total Si (mol/L) | APTES Si (mol %) | BTMSH Si (mol %) | BPGE to APTES | density (g/cm$^3$) | porosity (%) | shrinkage (%) | modulus (MPa) | recovered strain (%) | surface area (m$^2$/g) |
|---|---|---|---|---|---|---|---|---|---|---|
| 1  | 1   | 30 | 20 | 0.7 | 0.360 | 72.7 | 25 | 56.1 | 3.9 | b |
| 2  | 1.6 | 15 | 0  | 0.5 | 0.365 | 75.2 | 22 | 82.0 | 3.1 | 342 |
| 3  | 1.6 | 15 | 0  | 0.7 | 0.248 | 85.4 | 11 | 18.2 | 2.2 | 322 |
| 4  | 1.6 | 15 | 40 | 0.5 | 0.278 | 82.1 | 13 | 23.2 | 1.2 | 329 |
| 5  | 1   | 30 | 20 | 0.6 | 0.315 | 80.0 | 22 | 37.8 | 3.4 | b |
| 6  | 1   | 30 | 40 | 0.6 | 0.310 | 77.6 | 20 | 42.4 | 3.7 | 103 |
| 7  | 1   | 30 | 20 | 0.5 | 0.269 | 79.5 | 20 | 32.7 | 2.6 | 219 |
| 8  | 1   | 30 | 20 | 0.6 | 0.300 | 77.3 | 21 | 40.7 | a | b |
| 9  | 1   | 30 | 0  | 0.6 | 0.346 | 76.7 | 24 | b | b | 206 |
| 10 | 1   | 30 | 20 | 0.6 | 0.274 | 79.4 | 19 | 30.1 | 3.3 | 186 |
| 11 | 1   | 15 | 20 | 0.6 | 0.198 | 85.9 | 18 | 12.7 | 2.4 | 392 |
| 12 | 1.6 | 15 | 40 | 0.7 | 0.284 | 81.2 | 12 | 23.1 | 1.3 | 303 |

TABLE 1-continued

Summary of Data for Epoxy Cross-Linked Aerogels from Optimization Study

| run | total Si (mol/L) | APTES Si (mol %) | BTMSH Si (mol %) | BPGE to APTES | density (g/cm$^3$) | porosity (%) | shrinkage (%) | modulus (MPa) | recovered strain (%) | surface area (m$^2$/g) |
|---|---|---|---|---|---|---|---|---|---|---|
| 13 | 1 | 30 | 20 | 0.6 | 0.307 | 76.6 | 23 | 33.9 | 3.4 | $b$ |
| 14 | 1.6 | 45 | 0 | 0.7 | 0.670 | 52.9 | 19 | 260.1 | 6.7 | 97 |
| 15 | 1.6 | 30 | 20 | 0.6 | 0.533 | 60.2 | 22 | 150.6 | 4 | 139 |
| 16 | 1.6 | 45 | 40 | 0.5 | 0.847 | 35.9 | 28 | 326.6 | $a$ | 36 |

$a$ Sample broke before 25% strain
$b$ Not measured

Figure 2:
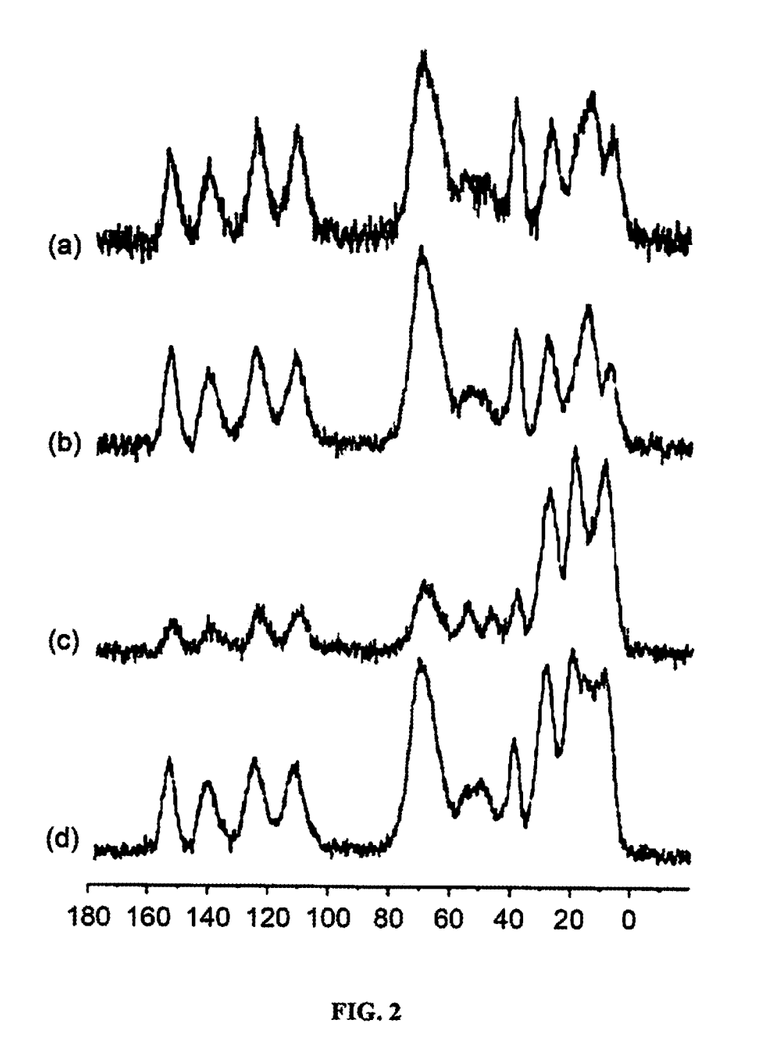
FIG. 2. Solid Si NMR of monoliths from runs listed, including (a) run 3 made from 15 mol % APTES Si and no BTMSH; (b) run 14 made from 45 mol % APTES Si and no BTMSH; (c) run 12 made from 15 mol % APTES Si and 40 mol % BTMSH Si; and (d) run 16 made from 45 mol % APTES Si and 40 mol % BTMSH Si.

Solid CCP-MAS NMR spectra of aerogels from the study are shown in FIG. 2a-d. In all spectra, peaks in the aromatic region and the peak at 70 ppm are due to epoxy links. Peaks at 9-20 ppm are due to the propyl groups from APTES (and the hexyl links from BTMSH if present). The peak at approximately 30 ppm arises from the methyls on the isopropylidene group of the epoxy (and the middle methylenes from BTMSH, if present). Peaks at 40 and 50-60 ppm are due to the carbons next to nitrogen from the propyl group of APTES and the reacted epoxy links, respectively. As shown in FIGS. 2a (15 mol % APTES) and 2b (45 mol % APTES), spectra from monoliths made using no BTMSH are nearly identical, indicating that the degree of reaction between epoxy and propyl amine are about the same. This is in agreement with the large increase in density as the APTES fraction is increased-all of the amines are reacting even when using 45 mol % APTES. The spectrum shown in FIG. 2c is from a monolith prepared using 15 mol % APTES and 40 mol % BTMSH. The epoxy peaks appear much smaller because of the increase in aliphatic peaks arising from BTMSH. However, the peak at 40 ppm (methylene of APTES next to nitrogen) is also much smaller and in line with the relative intensity of the epoxy peaks, again indicating that reaction of epoxy with amine is not affected by the presence of BTMSH. For the monolith prepared using 45 mol % APTES and 40 mol % BTMSH, the peaks due to epoxy and the 40 ppm peak due to methylene from APTES again grow larger, but remain about the same size relative to each other.

Figure 3:
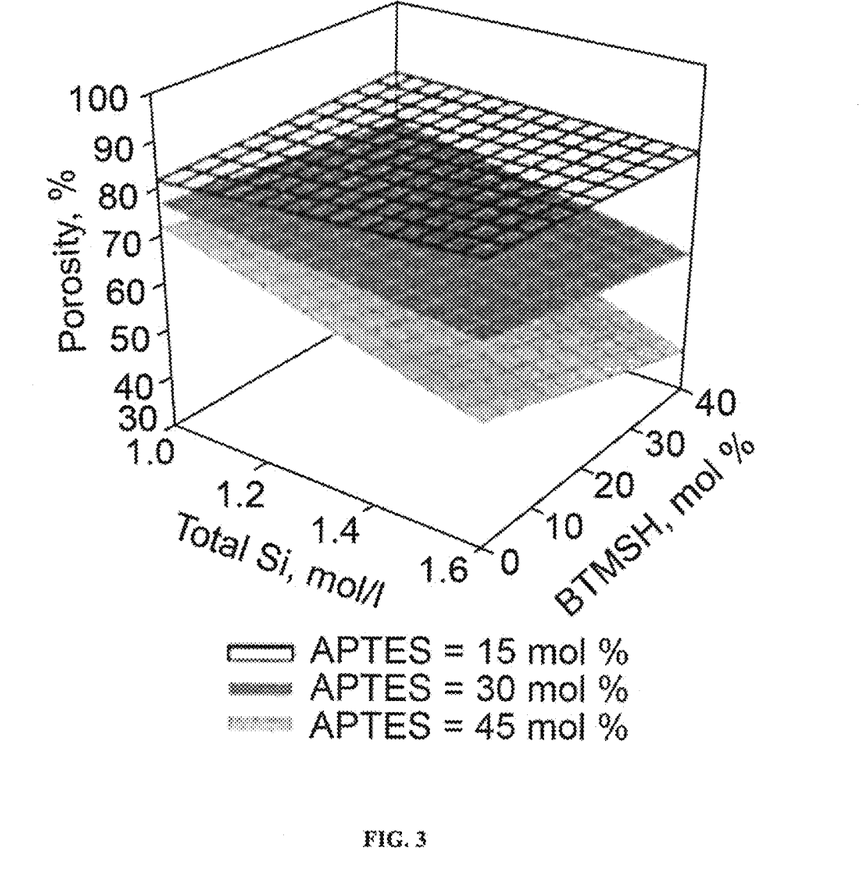
FIG. 3. Graph of the empirical model for porosity plotted vs fraction of Si derived From BTMSH and total silicon concentration.

A response surface plot of porosity (standard error=1.6%, $R^2$=0.99), calculated from the bulk density and skeletal density measured by helium pycnometry, graphed vs total silicon concentration and BTMSH fraction is shown in FIG. 3. Note that porosity decreases slightly because of increasing total silicon and BTMSH mol fraction, and dramatically decreases because of an increase in APTES concentration. Because porosity is a feature of aerogels important to their application, maintaining high levels of porosity is critical. Only monoliths made using APTES concentration of 15 mol % have porosities in excess of 80%. Except at the lowest total Si concentration studied (1 mol/L), higher concentrations of APTES in a one-pot reaction scheme result in porosities too low for use in typical aerogel applications.

Figure 4:
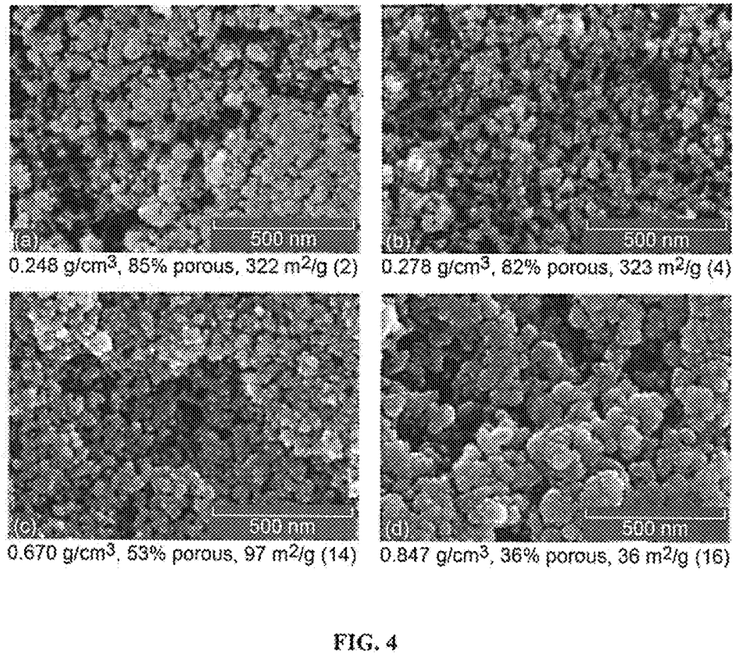
FIG. 4. Side-by-side comparisons of micrographs of samples from Table 1 with (left) no BTMSH and (right) 40 mol % BTMSH-derived Si, including samples prepared (a, b) with 15 mol % APTES and (c, d) with 45 mol % APTES). All samples were prepared using 1.6 mol/L total silicon concentration. Sample numbers are shown in parentheses.

Scanning electron micrographs of representative monoliths made using 1.6 mol/L total silicon concentration are shown in FIG. 4. Monoliths shown in FIGS. 4a (no BTMSH) and 4b (40 mol % BTMSH) made using 15 mol % APTES are similar in appearance to those previously reported using a multistep diffusion process. Note that the particle sizes are quite uniform in appearance in both micrographs, whereas the pores appear larger in FIG. 4b, as previously observed for hexyl-linked monoliths. The monoliths are somewhat similar in density and porosity to those previously prepared using the multistep process. In contrast, monoliths shown in FIGS. 4c (no BTMSH) and 4d (40 mL % BTMSH) made with 45 mol % APTES are twice as dense and 20-30% less porous than the same formulations made using a multistep process, again because of the near-complete reaction between APTES amines and epoxy obtained when diffusion is not a factor.

Figure 5A:
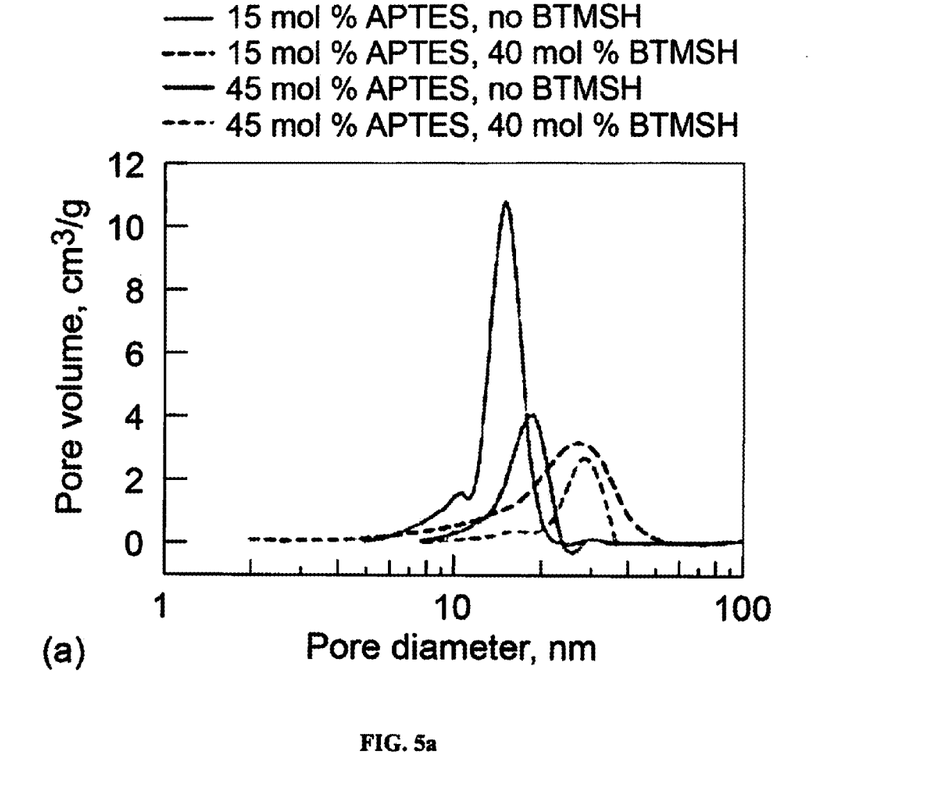
Figure 5B:
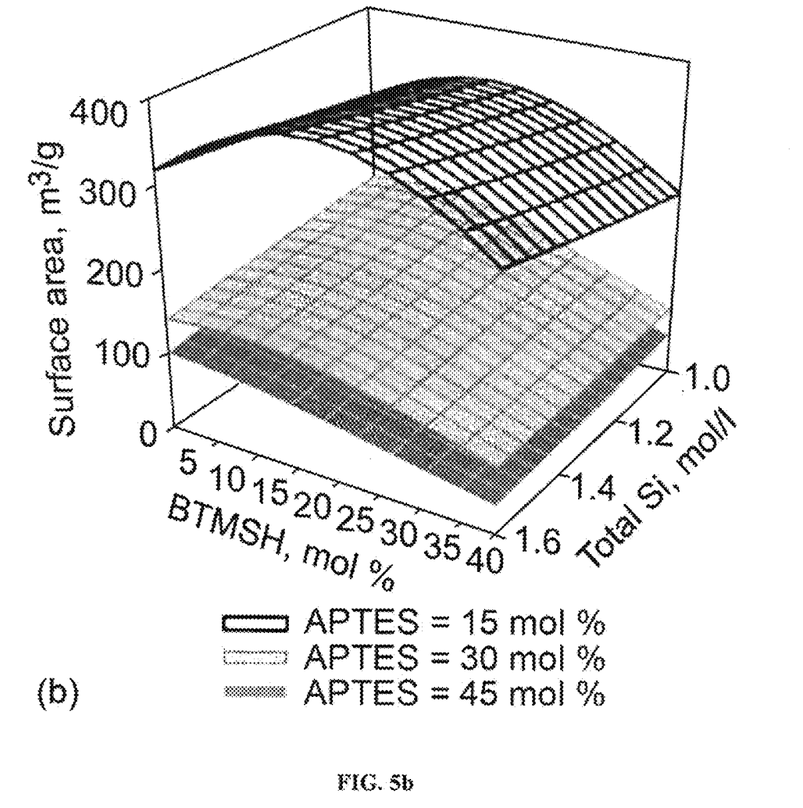

Mean pore diameter and surface area measurements were derived from nitrogen sorption data for all the samples using the Brunauer-Emmett-Teller (BET) method. Surface areas are listed in Table 1 and under micrographs shown in FIG. 4. The pore size measured by nitrogen sorption is known to be underestimated for aerogels because of contraction of the structure. Nevertheless, observed trends are consistent with that seen by SEM. Graphs of pore volume vs pore diameter in FIG. 5a illustrate a comparison of the same monoliths shown in the micrographs in FIG. 4 which were made using 1.6 mol/L total silicon concentration. Note that the narrowest pore size distribution and smallest pores are obtained for monoliths made using 15 mol % APTES and no BTMSH. Increasing APTES and BTMSH broadens the pore distributions and also causes a sift to larger pore sizes as seen previously with monoliths made using a multistep process. Similar results are seen with lower total silicon concentrations. BET surface areas are also much reduced by increasing APTES concentration as seen in FIG. 5b. FIG. 5b shows empirical models for surface area (standard error=0.01 $R^2$=0.99+) graphed vs total silicon concentration and BTMSH fraction. As can be seen in the plot, only 15 mol % APTES derived monoliths have surface areas higher than 300 m$^2$/g. Decreasing total silicon concentration and increasing BTMSH fraction also causes a small though significant decrease in surface area. In addition, as seen before with density and porosity, surface areas obtained for monoliths in this study prepared using 15 mol % APTES are comparable to the same formulations obtained from the multistep diffusion process whereas for those prepared with 45 mol % APTES the surface areas are reduced by a factor of 2.

Figure 6A:
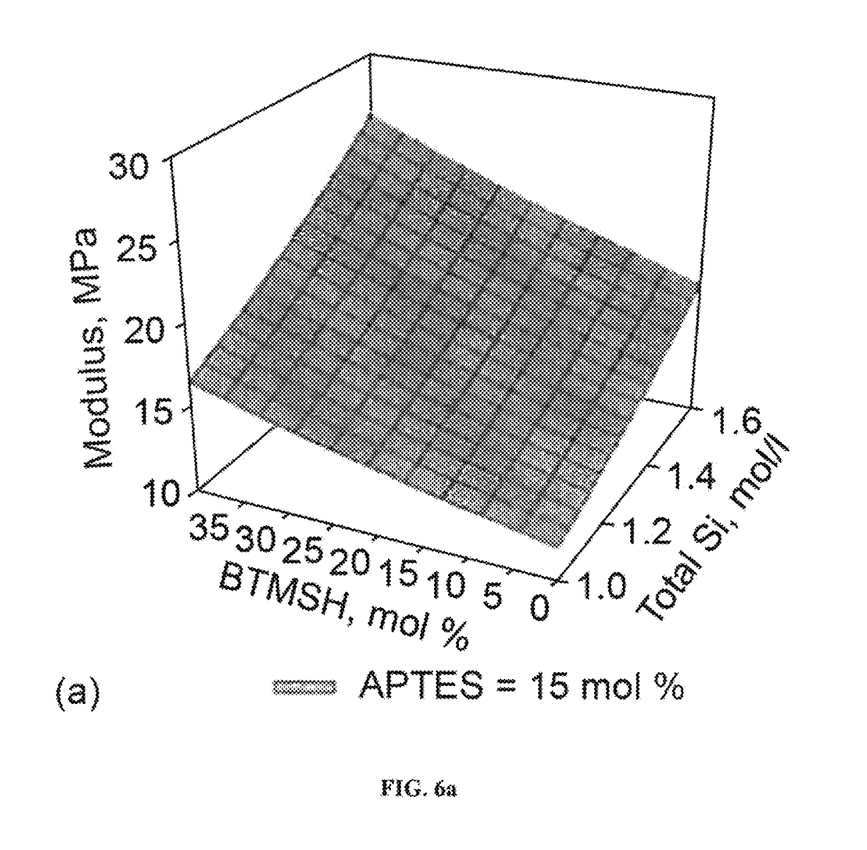
Figure 6B:
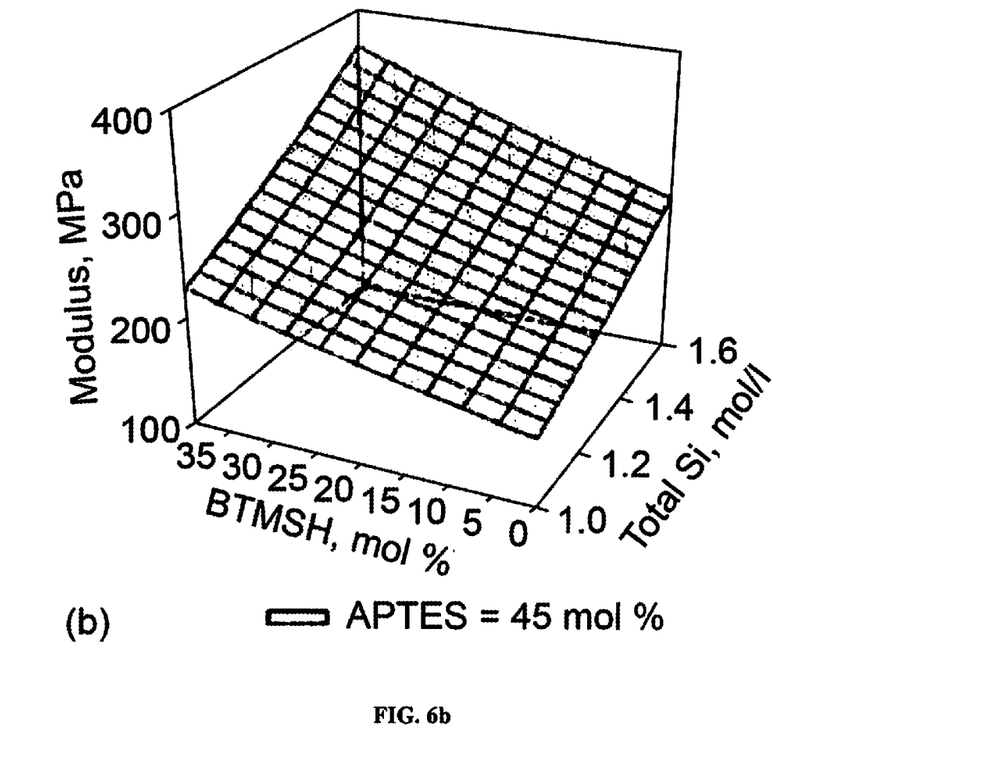

The monoliths were also characterized using compression testing. Young's modulus taken from the initial slope of the stress-strain curves was modeled using multiple linear regression analysis. Graphs of the empirical model for modulus (standard error=0.2, $R^2$=0.98) vs total silicon concentration and BTMSH fraction re shown in FIG. 6 for aerogels made using (a) 15 mol % APTES and (b) 45 mol % APTES. Increasing total silicon concentration and BTMSH fraction both significantly increase modulus as expected due to small increases in density. It is interesting to note that modulus of monoliths prepared using the multistep diffusion method in the previous study did not increase with increasing BTMSH mol fraction. This was due to the fact that in the previous study, use of BTMSH was seen to reduce shrinkage, especially for lower APTES formulations, resulting in lower densities. Using a one-pot reaction scheme, shrinkage is more dependent on the amount of APTES and the ratio of epoxy to APTES used. In the graphs shown in FIG. 6, APTES mol fraction and epoxy to APTES mol fraction and epoxy to APTES ratios are held constant, making shrinkage a nonfactor in these plots. As seen in FIG. 6b, monoliths made from 45 mol % APTES are an order of magnitude stronger because of the dramatic increase in density. However, as previously discussed, except for monoliths made using the lowest total Si concentration, these monoliths have extremely low porosity and surface area, reducing their utility as insulators or other applications usually considered for aerogels.

Figure 7A:
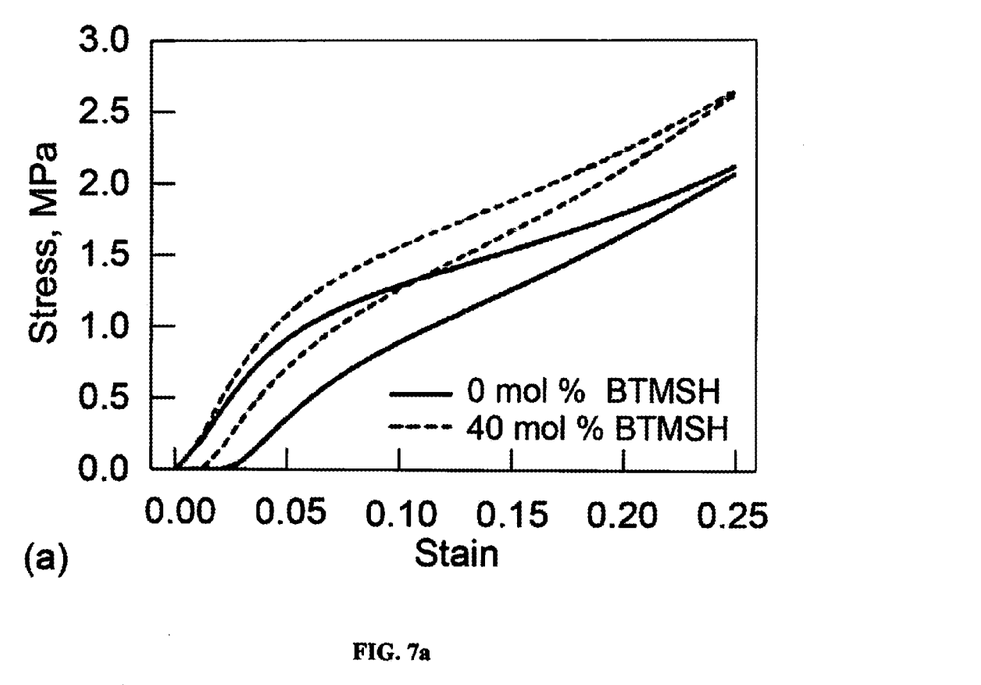
Figure 7B:
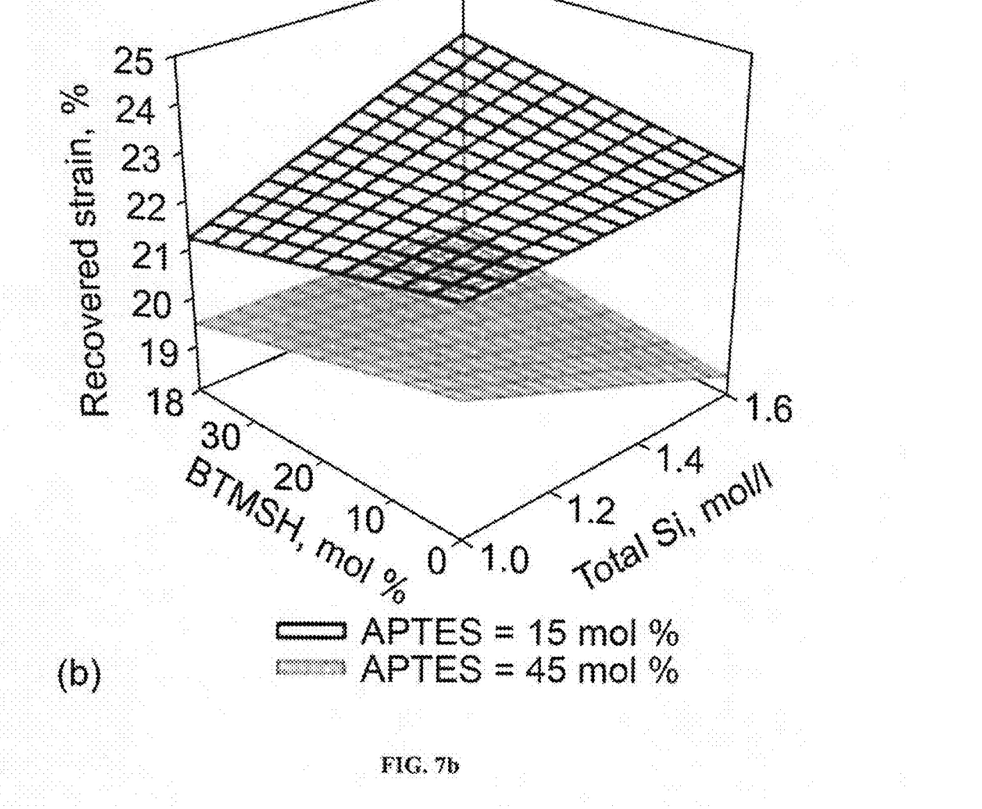

Elastic recovery after compression was also assessed by compressing samples to 25% strain, followed by allowing them to relax. Typical stress strain curves for repeat compression tests are shown in FIG. 7a for monoliths from Table 1 made using 1.6 mol/L total silicon and 15% APTES. The solid black curves are the first and second compression for run 3 (no BTMSH) and the dashed red curves are for run 12 (40 mol % BTMSH). Interestingly, most of the samples made from the one-pot reaction scheme recover better than those made with the multistep diffusion process previously reported. In the examples shown, the sample containing no hexyl links recovered all but 2.2% of the 25% compared to 5% for the multistep sample reported previously. Clearly, epoxy is contributing more to elastic recovery when included in the initial sol in the one pot reaction scheme. This may be due to the presence of epoxy inside of the secondary particles, whereas these smallest pores may not be accessible to epoxy in the diffusion controlled process. The sample with hexyl links recovered all but 1.3% of the 25%, which was similar to the multistep sample previously reported (all but 1% unrecovered strain). Note, however, that modulus is slightly higher for the hexyl linked samples made using the one-pot reaction, again because of the slight increase in density. Streamlining the process of making epoxy reinforced aerogels by eliminating the diffusion step produces aerogels of similar density and pore structure to those previously reported using a multistep reaction scheme when using 15 mol % APTES as amine cross-linking site. However, by comparing aerogels fabricated from higher APTES concentrations made using both methods, we also present evidence for the first time that monomer is not diffused uniformly in gels using the multistep process. Aerogels made using a one-pot reaction scheme and high concentrations of APTES are extremely high in density with low percent porosities and extremely low surface areas compared to multistep aerogels. This is due to the complete reaction of epoxy with all amines present when diffusion into the gel is not a factor. In fact, using the one-pot method, only monoliths made using 15 mol % APTES can truly be considered aerogels and suitable for use as insulation or other applications requiring high surface areas, high porosity, and small pore sizes.

Slight improvements to mechanical properties over aerogels made using a multistep diffusion process are also evidenced. In particular, hexyl-linked aerogels made using 1.6 mol/L and 15 mol % APTES are similar in elastic recovery, density, and surface area to those previously reported using a multistep process, whereas the modulus is increased by a factor of 2. Most importantly, the method of making the aerogels is greatly simplified by eliminating two wash steps before cross-linking and the epoxy diffusion step. This reduces the amount of solvent needed to make the aerogels by a least half with no compromise in properties.

While this invention has been described with preferred embodiments, it should be understood that various modifications and variations will be apparent to one skilled in the art and that such modifications and variations come within the scope of the appended claims.

The invention claimed is:

1. A one-pot process for preparing a polymer-reinforced monolithic silica aerogel which comprises:
    providing a one-pot process for preparing a polymer-reinforced monolithic silica aerogel capable of reacting at least one silicon compound selected from the group consisting of an orthosilicate, an alkoxysilane and a combination thereof with effective amounts of multifunctional cross-linking agent and an aminoalkoxy silane in an alcohol solution, wherein the multifunctional cross-linking agent does not react with alcohol but is soluble in alcohol;
    wherein the molar ratio of cross-linking agent to the aminoalkoxy silane is stoichiometric to obtain a silica sol in solution also containing the cross-linking agent;
    subsequently forming a silica gel which contains said cross-linking agent in the solution phase of the gel;
    subjecting said gel to conditions that promote reaction of said cross-linking agent to silica gel; and
    drying said polymer reinforced silica gel to obtain the polymer-reinforced monolithic silica aerogel.

2. The process of claim 1 wherein the silicon compound is an orthosilicate.

3. The process of claim 1 wherein the silicon compound is an alkoxy silane.

4. The process of claim 1 wherein the silicon compound is a combination of the orthosilicate and an alkoxy silane.

5. The process of claim 2 wherein the orthosilicate is tetraalkyl orthosilicate.

6. The process of claim 1 wherein the aminoalkoxy silane is 3-aminopropyl-triethoxysilane.

7. The process of claim 1 wherein the sol solution contains alcohol.

8. The process of claim 1 wherein promoting the reaction of the cross-linking agent to silica gel is initiated by conditions selected from the group consisting of heat, U.V. light, catalyst, and combinations thereof.

9. The process of claim 1 wherein the temperatures of the one-pot reaction ranges from about 70° to above 200° C.

10. The process of claim 1 wherein the one-pot reaction consist essentially of an orthosilicate and an alkoxy silane in the presence of the cross-linking agent to obtain the silica sol reaction product in solution which is subsequently gelled, polymerized and supercritically dried.

11. The polymer-reinforced monolithic silica aerogel obtained by the process of claim 1.

12. The polymer-reinforced monolithic silica aerogel obtained by the process of claim 4.

* * * * *